under 35 U.S.C. 154(b) by 424 days.

(12) United States Patent
Kukucka et al.

(10) Patent No.: US 7,654,680 B2
(45) Date of Patent: Feb. 2, 2010

(54) CONSOLE ASSEMBLY

(75) Inventors: Richard J Kukucka, Ann Arbor, MI (US); Anthony B Micallef, Lake Orion, MI (US); Brian M Chaloult, Rochester Hills, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 424 days.

(21) Appl. No.: 11/363,705

(22) Filed: Feb. 28, 2006

(65) Prior Publication Data

US 2007/0200041 A1    Aug. 30, 2007

(51) Int. Cl.
*B60Q 1/10* (2006.01)
*B60Q 1/26* (2006.01)

(52) U.S. Cl. .................. 362/84; 362/471; 362/488

(58) Field of Classification Search .......... 362/488–492, 362/471, 84, 295, 85, 253; 40/593
See application file for complete search history.

(56) References Cited

U.S. PATENT DOCUMENTS

| | | | |
|---|---|---|---|
| 6,419,379 B1 | 7/2002 | Hulse | |
| 6,464,381 B2 * | 10/2002 | Anderson et al. | 362/488 |
| 6,707,379 B2 * | 3/2004 | Nagasaka | 340/456 |
| 6,733,166 B2 | 5/2004 | Hulse | |
| 6,896,387 B2 * | 5/2005 | Renfro | 362/602 |
| 2007/0139943 A1 * | 6/2007 | Bone et al. | 362/488 |

* cited by examiner

*Primary Examiner*—Bao Q Truong
(74) *Attorney, Agent, or Firm*—Ralph E. Smith

(57) ABSTRACT

A console assembly for an automobile is provided. The console assembly includes a console and a cable. The console has at least one cavity for receiving objects. The at least one cavity is illuminated by the cable containing an electroluminescent (EL) tape.

18 Claims, 3 Drawing Sheets

CONSOLE ASSEMBLY

FIELD OF THE INVENTION

The present invention generally relates to an automobile. More particularly, the present invention relates to a console assembly for an automobile.

BACKGROUND OF THE INVENTION

In an automobile, a console assembly has various utilities. For instance, the console assembly can be utilized for installing accessories such as music systems, display screens, or for placing objects such as cups, bottles, glasses and mugs. The objects may be placed in cavities such as cup-holders in the console assembly. In the absence of proper light, such as during night time, it may be difficult for an occupant of the automobile to locate the cup-holders to place the objects.

Hence, there is a need for illuminating the cavities in the console assembly. Further, the means for illuminating may also improve the visual appearance of the interior of the automobile.

SUMMARY OF THE INVENTION

It is an object of the present invention to provide illumination at a console assembly in an automobile for enabling proper placement of objects such as glasses, in a cup holder.

Another object of the present invention is to enhance the visual appearance of the interior of an automobile.

The present invention provides a console assembly having a console and a cable. The console has at least one cavity for receiving objects. The at least one cavity is illuminated by the cable. The cable contains an electroluminescent (EL) tape.

BRIEF DESCRIPTION OF THE DRAWINGS

The various embodiments of the invention will hereinafter be described in conjunction with the appended drawings, provided to illustrate and not to limit the invention, wherein like designations denote like elements, and in which.

DETAILED DESCRIPTION OF THE PREFERRED EMBODIMENTS

The present invention relates to a console assembly for an automobile. The console assembly has a console having at least one cavity for receiving one or more objects. The at least one cavity is illuminated by a cable containing an electroluminescent (EL) tape.

Figure 1:
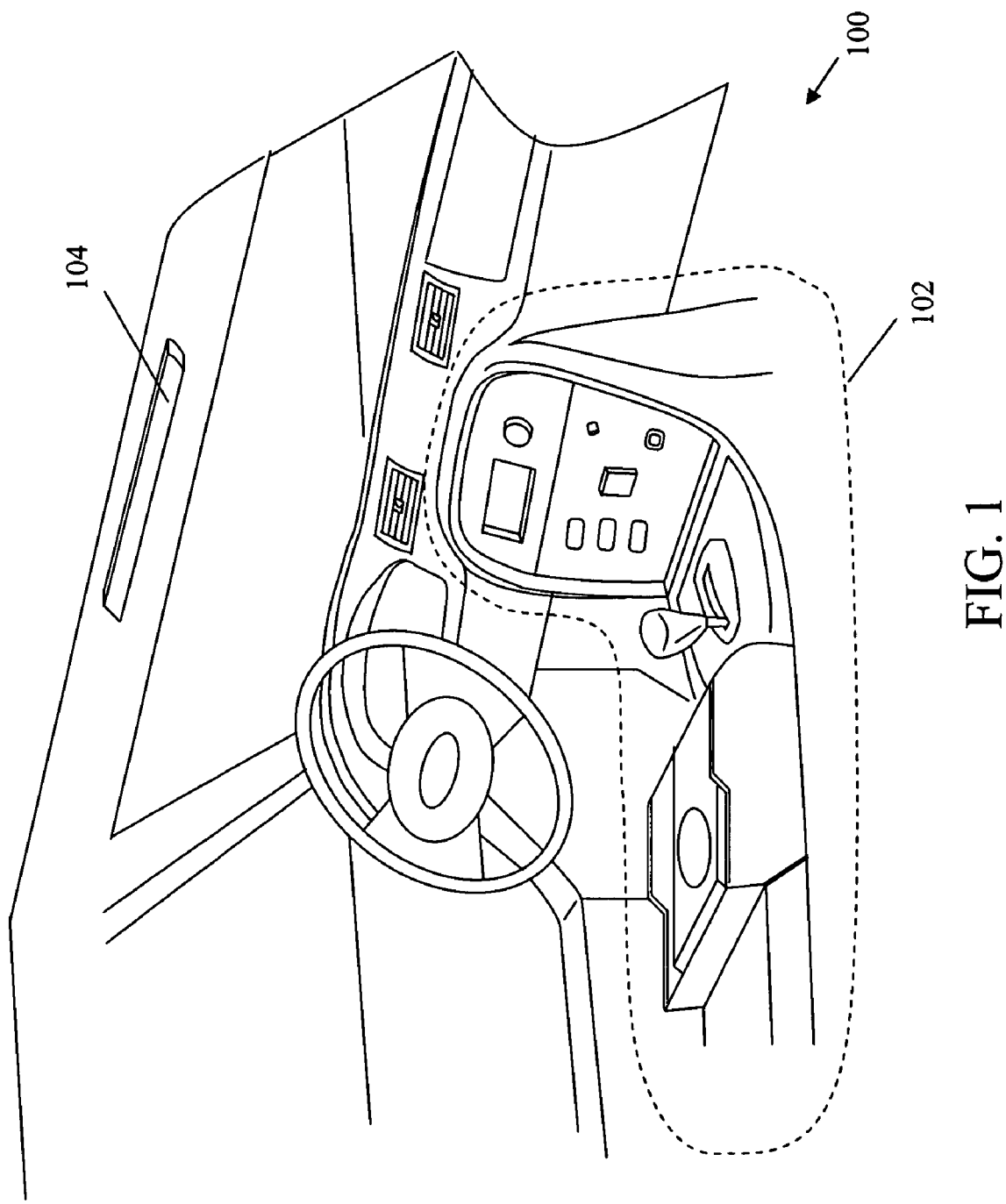
FIG. 1 shows a perspective view of the interior of an automobile, in accordance with an embodiment of the present invention.

FIG. 1 shows a perspective view 100 of interior of an automobile, in accordance with an embodiment of the present invention. The perspective view 100 includes a console assembly 102 and an interior light 104. The console assembly 102 can be mounted at various locations in the automobile, for example, at the floor of the automobile. The console assembly 102 can include various accessories such as a music player, a cassette holder, a cigarette lighter, a cup-holder, interior lights, and the like. The console assembly 102 may also include controls of the interior light 104. The interior light 104 illuminates the interior of the automobile.

Figure 2:
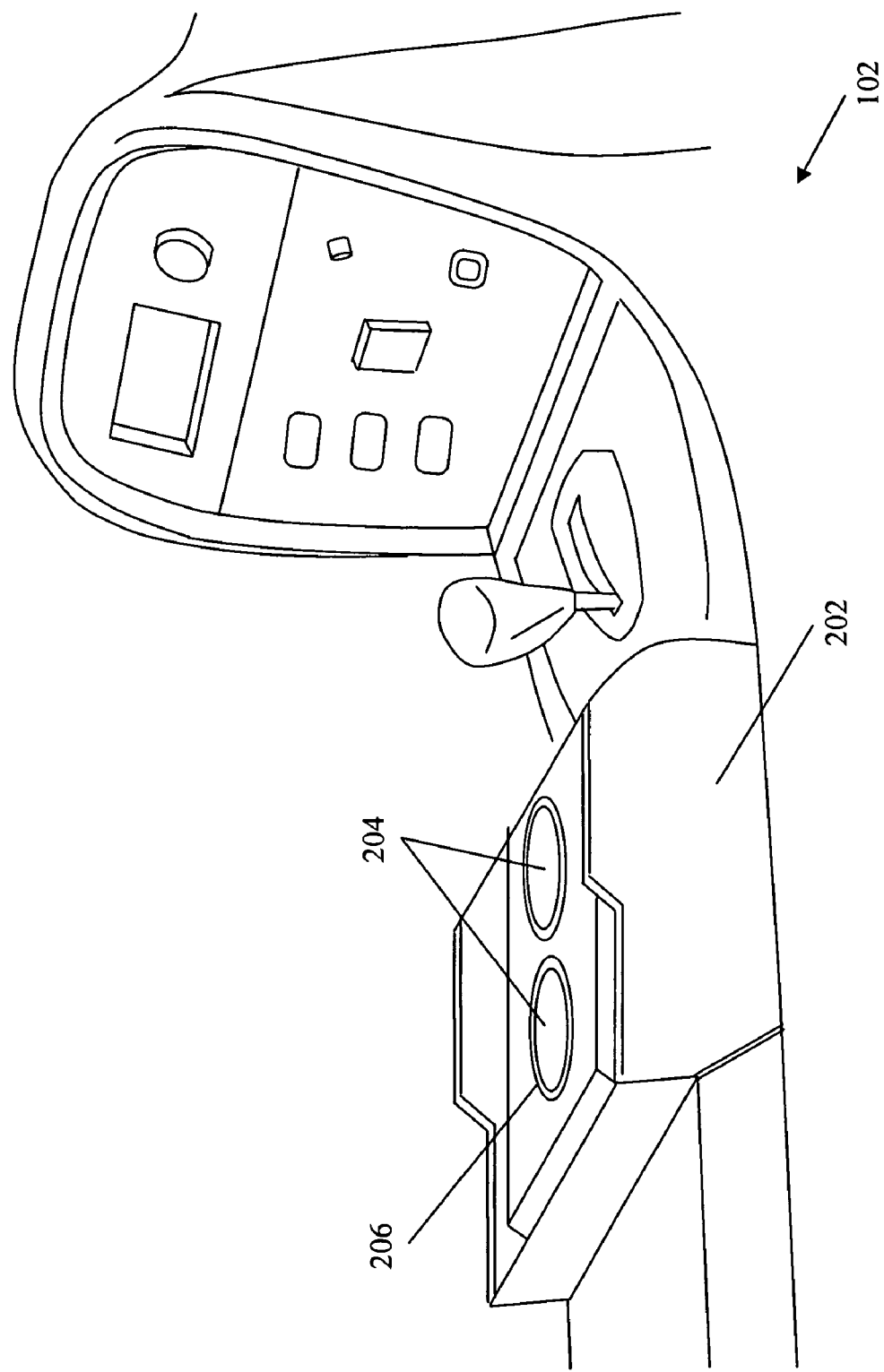
FIG. 2 shows a console assembly for an automobile, in accordance with an embodiment of the present invention.

FIG. 2 shows the console assembly 102 of the automobile, in accordance with an embodiment of the present invention. The console assembly 102 includes a console 202. Though the console assembly 102 is shown to include only the console 202, it is apparent to a person skilled in the art that the console assembly 102 may include a plurality of consoles and additional components as well. The console 202 has at least one cavity 204 for receiving objects such as cups, bottles and glasses. In an embodiment of the present invention, the at least one cavity 204 is a cup-holder. The at least one cavity 204 is illuminated by a cable 206. The cable 206 contains an Electroluminescent (EL) tape. An EL tape has at least two wires made of a conductive material, such as copper or aluminum, wound around a semi-conductive material such as phosphorous. The at least two wires act as electrodes that enable emission of light from the semi-conductive material. In an embodiment of the present invention, the EL tape can be connected to an interior-lighting-circuit of the automobile. The interior-lighting-circuit controls illumination inside the automobile. Further, the intensity of illumination of the EL tape can be adjusted by the interior-lighting-circuit. The intensity of illumination of the EL tape can be varied depending on the requirements of a passenger in the automobile. The electric power to the EL tape in the cable 206 can be supplied by an inverter in the automobile. In an embodiment of the present invention, the cable 206 illuminates the at least one cavity 204 as soon as the engine of the automobile starts. In one embodiment, the illumination by the cable 206 is visible only when the ambient light is very dim. So, even though the cable 206 is illuminated whenever the automobile is powered up, the illumination is not visible till the ambient light becomes very dim. In an embodiment of the present invention, the cable 206 can be mounted along the edges of the at least one cavity 204. For example, the cable 206 can be mounted at the periphery of a cup-holder in the console 202.

Figure 3:
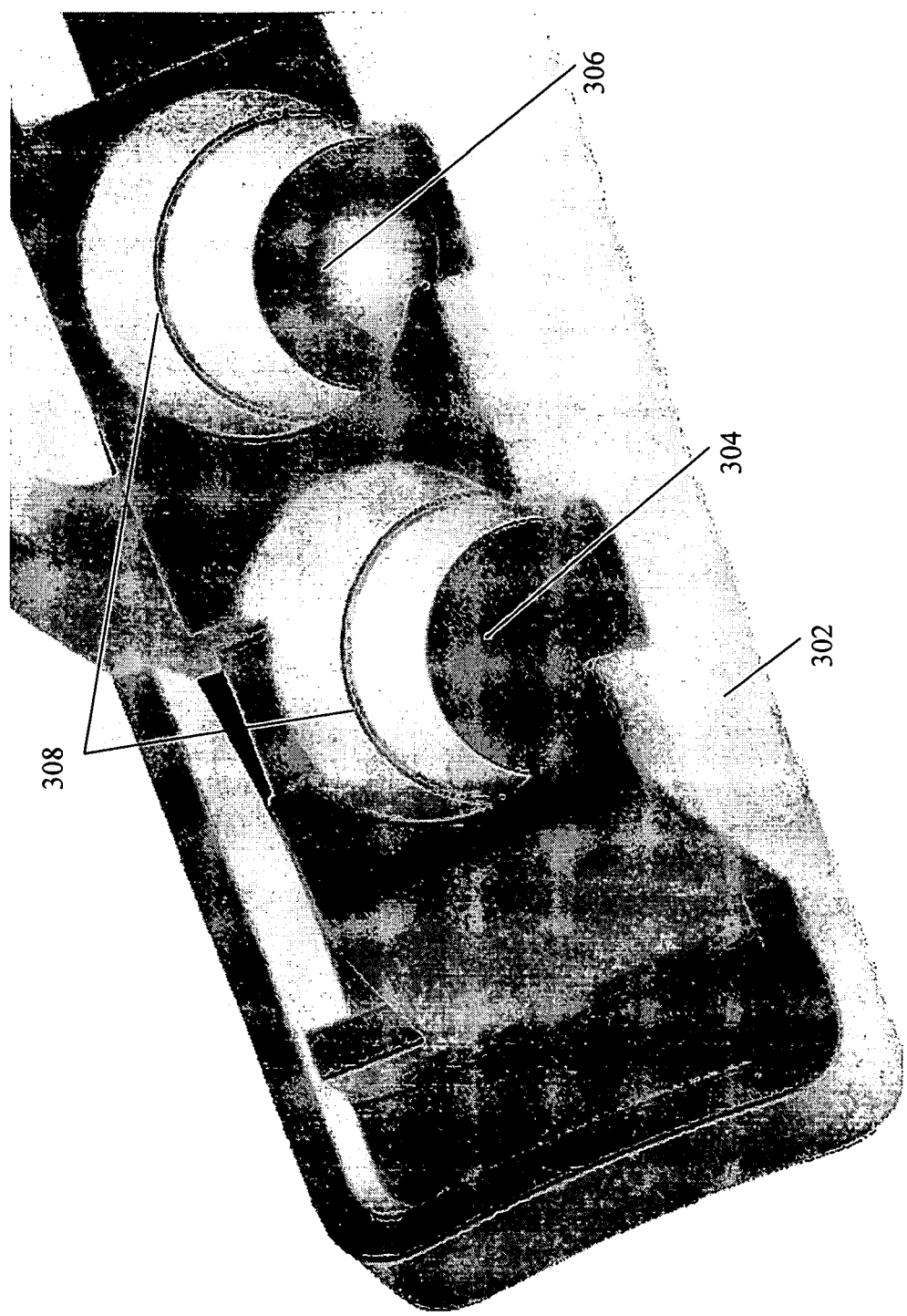
FIG. 3 shows a console for an automobile, in accordance with an embodiment of the present invention.

FIG. 3 shows a console 302 for an automobile, in accordance with an exemplary embodiment of the present invention. The console 302 includes a first cup holder 304, a second cup holder 306 and an EL tape 308. The first cup holder 304 and the second cup holder 306 at the console 302 can receive objects such as cups, glasses and bottles. Though the console 302 is shown to include the first cup holder 304 and the second cup holder 306, it is apparent to a person skilled in the art that the console 302 may include greater or fewer number of cup holders. The EL tape 308 is mounted at the edges of the first cup holder 304 and the second cup holder 306. Though the console 302 is shown to include only the EL tape 308, it is apparent to a person skilled in the art that the console 302 may include a plurality of EL tapes. In an embodiment of the present invention, the EL tape 308 can be enclosed in a cable. In another embodiment of the present invention, intensity of the illumination by the EL tape 308 can be adjusted by an interior-lighting-circuit of the automobile. The interior-lighting-circuit regulates illumination in the automobile. The intensity of the illumination can be such that the illumination by the EL tape 308 is visible only when ambient light in the automobile is poor. For instance, the illumination by the EL cable can be visible at night but not during daytime. Further, the EL tape 308 can be powered by an inverter in the automobile. In another embodiment of the present invention, the first cup holder 304 and the second cup holder 306 can be illuminated as soon as the engine of the automobile starts.

An advantage of the console assembly as described earlier in the description is that the illumination of the EL tape makes it easier to place an object in a cup holder even when visibility in the automobile is poor. This increases the comfort level of a passenger in the automobile and also minimizes the risk of spillage of a drink from a mug while stowing the mug in the cup holder or retrieving the mug from the cup holder. Further, illuminating the cup holders at the console assembly enhances the visual appearances of the automobile.

While the various embodiments of the invention have been illustrated and described, it will be clear that the invention is not limited only to these embodiments. Numerous modifications, changes, variations, substitutions, and equivalents will be apparent to those skilled in the art, without departing from the spirit and scope of the invention, as described in the claims.

What is claimed is:

1. A console assembly for an automobile, the console assembly comprising:
    (a) a console, the console having at least one cavity for receiving objects; and
    (b) a cable, the cable containing an electroluminescent (EL) tape for illuminating the at least one cavity.

2. The console assembly according to claim 1, wherein the cable is mounted along at least a portion of a peripheral edge of the at least one cavity.

3. The console assembly according to claim 1, wherein the at least one cavity is a cup-holder.

4. The console assembly according to claim 1, wherein the EL tape is connected to an interior-lighting-circuit of the automobile, wherein intensity of illumination by the EL tape is adjusted by the interior-lighting-circuit.

5. The console assembly according to claim 1, wherein the EL tape is powered by an inverter.

6. The console assembly according to claim 1, wherein the at least one cavity is illuminated when the engine of the automobile starts.

7. A console for an automobile, the console comprising:
    (a) at least one cup-holder at the console for receiving objects; and
    (b) an electroluminescent (EL) tape, the EL tape being mounted at or along a peripheral edge of the at least one cup-holder.

8. The console according to claim 7, wherein the EL tape is enclosed in a cable.

9. The console according to claim 7, wherein intensity of illumination by the EL tape is adjusted by an interior-lighting-circuit of the automobile, wherein the interior-lighting-circuit regulates illumination in the automobile.

10. The console according to claim 7, wherein the EL tape is powered by an inverter.

11. The console according to claim 7, wherein the at least one cup-holder is illuminated when the automobile is powered-up.

12. A console for an automobile, the console comprising:
    (a) at least one generally cylindrical and recessed cup holder having at least one substantially annular edge encompassing a periphery thereof;
    (b) an electroluminescent tape that extends substantially about the annular edge of the cup holder;
    (c) an interior lighting circuit of the automobile connected to the electroluminescent tape providing electrical power thereto; and
    (d) wherein the interior lighting circuit is configured to (i) automatically light the electroluminescent tape when the automobile is powered up, and (ii) enable adjustment of the intensity of the illumination of the electroluminescent tape.

13. The console according to claim 12 further comprising an electrical cable connected to the electroluminescent tape and an inverter connected to the electrical cable.

14. The console according to claim 12 wherein the annular edge of the cup holder comprises a top edge of the cup holder.

15. The console according to claim 12 wherein the cup holder has a bottom, an intermediate annular edge and a top annular edge, and wherein the electroluminescent tape extends substantially about the intermediate annular edge of the cup holder.

16. The console according to claim 12 wherein the electroluminescent tape is comprised of a plurality of electrically conductive wires carrying a semi-conductive electroluminescent material.

17. The console according to claim 16 wherein the electroluminescent tape is comprised of a cable.

18. The console according to claim 12 wherein the console is a center con sole of the automobile.

* * * * *